(12) United States Patent
Henry et al.

(10) Patent No.: US 12,096,720 B2
(45) Date of Patent: *Sep. 24, 2024

(54) ROTARY MOWER WITH CUTTING DECK WITH BIDIRECTIONAL CUTTING BLADES

(71) Applicant: The Toro Company, Bloomington, MN (US)

(72) Inventors: Jason J. Henry, Lakeville, MN (US); Chris A. Wadzinski, Inver Grove Heights, MN (US)

(73) Assignee: The Toro Company, Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,334

(22) Filed: Jul. 10, 2023

(65) Prior Publication Data

US 2024/0008405 A1    Jan. 11, 2024

Related U.S. Application Data

(63) Continuation of application No. 17/195,113, filed on Mar. 8, 2021, now Pat. No. 11,730,083.

(Continued)

(51) Int. Cl.
*A01D 42/00*    (2006.01)
*A01D 34/66*    (2006.01)
(Continued)

(52) U.S. Cl.
CPC ......... *A01D 42/005* (2013.01); *A01D 34/667* (2013.01); *A01D 34/73* (2013.01); *A01D 34/76* (2013.01)

(58) Field of Classification Search
CPC ...... A01D 42/005; A01D 34/73; A01D 34/76; A01D 34/667
See application file for complete search history.

(56) References Cited

U.S. PATENT DOCUMENTS 2,760,327 A    8/1956    Bovee
4,055,036 A    10/1977   Kidd
(Continued)

FOREIGN PATENT DOCUMENTS

DE    7030896        2/1971
JP    2002-000032 A  1/2002
(Continued)

OTHER PUBLICATIONS

International Search Report and Written Opinion for Application No. PCT/IB2021/051923 mailed Jun. 9, 2021.

(Continued)

*Primary Examiner* — Abigail A Risic
(74) *Attorney, Agent, or Firm* — Merchant & Gould P.C.

(57) ABSTRACT

A rotary lawn mower has one or more grass cutting blades that are rotatable in opposite directions about a vertical axis or axes. Each blade is double edged having front and rear cutting edges on each end of the blade. Each blade end has a front sloped face inboard of the front cutting edge and a rear sloped face inboard of the rear cutting edge. These faces create air flow within the cutting chamber when cutting grass regardless of the direction of rotation of the blade. The direction of rotation of each blade is reversed to switch between discharge and mulching modes of operation. A flow director has a curved vertical guide wall that guides the grass clippings through a discharge opening in the discharge mode and that guides the flow of grass clippings away from the discharge opening in the mulching mode.

20 Claims, 7 Drawing Sheets

Related U.S. Application Data (60) Provisional application No. 62/987,086, filed on Mar. 9, 2020.

(51) Int. Cl.
    *A01D 34/73*     (2006.01)
    *A01D 34/76*     (2006.01)

(56) References Cited

U.S. PATENT DOCUMENTS

| | | |
|---|---|---|
| 4,149,358 A | 4/1979 | Comer |
| 5,199,251 A | 4/1993 | Rouse et al. |
| 5,233,820 A * | 8/1993 | Willsie .................. A01D 34/73 |
| | | 56/DIG. 17 |
| 5,357,738 A | 10/1994 | Griffiths |
| 5,619,846 A | 4/1997 | Brown |
| 6,138,444 A | 10/2000 | Torras |
| 6,164,049 A | 12/2000 | Burch |
| 6,848,245 B2 | 2/2005 | Hancock et al. |
| 6,953,398 B1 | 10/2005 | Turner |
| 7,574,852 B1 | 8/2009 | Loxterkamp et al. |
| 7,797,917 B1 | 9/2010 | Pendleton |
| D816,445 S | 5/2018 | Hobrath et al. |
| 2005/0193707 A1 | 9/2005 | Hancock et al. |
| 2007/0227113 A1 | 10/2007 | Schuyler |
| 2008/0047249 A1 | 2/2008 | Davis et al. |
| 2008/0072555 A1 | 3/2008 | Samejima et al. |
| 2009/0223193 A1 | 9/2009 | Funnel |
| 2011/0277438 A1 | 11/2011 | Peruso, Jr. |
| 2015/0271997 A1 | 10/2015 | Kurioka et al. |
| 2018/0139901 A1 | 5/2018 | Teko et al. |
| 2021/0274707 A1 | 9/2021 | Shimada et al. |
| 2021/0274711 A1 | 9/2021 | Henry et al. |
| 2022/0183227 A1 | 6/2022 | Xu |

FOREIGN PATENT DOCUMENTS

| | | |
|---|---|---|
| JP | 2002000032 | 1/2002 |
| JP | 2009-11223 A | 1/2009 |
| JP | 200911223 | 1/2009 |

OTHER PUBLICATIONS

European Search Report for Application No. 21768749.0 mailed Jan. 8, 2024.

* cited by examiner

ROTARY MOWER WITH CUTTING DECK WITH BIDIRECTIONAL CUTTING BLADES

CROSS-REFERENCE TO RELATED APPLICATIONS

This application is a continuation of U.S. Application Ser. No. 17,195, 113, filed Mar. 8, 2021; now U.S. Pat. No. 11,730,083, which claims the benefit of U.S. Provisional Application No. 62/987,086, filed Mar. 9, 2020, the disclosures of which are hereby incorporated by reference in their entireties.

TECHNICAL FIELD

This invention relates to a cutting deck for mowers having a plurality of rotary cutting blades for cutting a swath of grass that is wider than the swath cut by any single blade and to a mower equipped with such a cutting deck. More particularly, this invention relates to such a cutting deck having multiple modes of discharge of the grass clippings generated by the operation of the blades.

BACKGROUND OF THE INVENTION

Rotary mowers which employ a cutting deck to house multiple rotary cutting blades that rotate about vertical axes are well known for cutting grass. The deck is carried by a traction frame for propelling the deck over the ground and for powering the cutting blades. The traction frame may comprise a ride on unit which carries the operator in a sitting and/or standing position during operation of the mower. Alternatively, the traction frame may comprise a walk behind unit in which the operator walks on the ground behind the traction frame during operation of the mower. In some cases, the traction frame may be remotely controlled by an operator or may operate in an autonomous manner under the control of an electronic microprocessor based controller.

The cutting blades carried in the deck are typically staggered fore-and-aft relative to one another. This permits the orbits of the blades to avoid hitting one another but to be slightly overlapped with one another to allow the blades to collectively cut a swath of grass that is wider than the swath cut by any single blade. Alternatively, the blades may be arranged directly side-by-side relative to one another with the orbits of the blades slightly overlapping to again cut a swath of grass that is wider than the swath cut by any single blade. However, in this direct side-by-side arrangement of the blades, the rotation of the blades must be timed to prevent the blades from hitting one another as they rotate.

The grass clippings generated by the operation of the blades may be discharged from the cutting deck in various modes. For example, the side discharge mode throws the clippings laterally from the deck through a side discharge opening located in a side wall of the deck. The mulching mode comprises the discharge of the clippings downwardly into the cut grass swath through an open bottom face of the deck. Some decks may also include a rear discharge mode in which the clippings are thrown rearwardly through a rear discharge opening. One or more of these modes may be incorporated into any given deck as desired.

In known rotary cutting decks having multiple discharge modes, e.g., both side discharge and mulching modes, some structure is normally provided for blocking the side discharge opening when the user wishes to operate in the mulching mode. This structure varies but often includes a selectively pivotal plate or door that closes the side discharge opening during operation in the mulching mode. In some cases, a closure member must be manually installed in the side discharge opening as part of a mulching kit rather than using a pivotal plate or door. In other cases, the pivotal plate or door is permanently installed in the deck and is swung between open and closed positions by the operator using a manually operable mechanical linkage or an electric motor kit. Regardless of how one closes the side discharge opening, the need for some type of closure and the operation or installation of such closure increases the expense of manufacturing the deck. Moreover, when a mulching kit is used that must be manually installed to mulch and must then be manually removed for side discharge, the burden on the operator in shifting between the different modes is significant.

Accordingly, there is a need in the art to provide a rotary cutting deck that is optimized for operation in the side discharge and mulching modes with the operator having the ability to quickly and easily shift between the modes. This invention is directed to satisfying this need.

SUMMARY OF THE INVENTION

One aspect of this invention relates to a rotary lawn mower having a cutting deck comprising a top wall and a peripheral skirt extending downwardly from the top wall. The top wall and peripheral skirt form a cutting chamber having an open bottom face. The cutting chamber has a discharge opening located at least partially in the peripheral skirt of the deck for allowing grass clippings to exit from the cutting chamber. At least one cutting blade is located within the cutting chamber with the at least one blade being rotatable about a substantially vertical axis of rotation. Each end of the at least one blade comprises a front cutting edge and a rear cutting edge, an upwardly raised, front sloped face inboard of the front cutting edge, and an upwardly raised, rear sloped face inboard of the rear cutting edge. A reversible blade drive is provided for allowing a user to select either a discharge mode of operation in which the at least one blade rotates in a first direction about the axis of rotation with the front cutting edges being leading edges and the rear cutting edges being trailing edges or a mulching mode of operation in which the at least one blade rotates in a second opposite direction about the axis of rotation with the rear cutting edges being leading edges and the front cutting edges being trailing edges.

Another aspect of this invention relates to a rotary lawn mower which comprises a cutting deck comprising a top wall and a peripheral skirt extending downwardly from the top wall. The top wall and peripheral skirt form a cutting chamber having an open bottom face. The cutting chamber has a discharge opening located at least partially in the peripheral skirt of the deck for allowing grass clippings to exit from the cutting chamber. At least one cutting blade is located within the cutting chamber with the at least one blade being rotatable about a substantially vertical axis of rotation. Each end of the at least one blade comprises a front cutting edge and a rear cutting edge. A reversible blade drive system is provided for allowing a user to select either a discharge mode of operation in which the at least one blade rotates in a first direction about the axis of rotation with the front cutting edges being leading edges and the rear cutting edges being trailing edges or a mulching mode of operation in which the at least one blade rotates in a second opposite direction about the axis of rotation with the rear cutting edges being leading edges and the front cutting edges being trailing edges. The cutting chamber has a substantially vertical guide wall therein adjacent the discharge opening. The guide wall presents an outward side to grass clippings that have been generated in the discharge mode to direct such clippings outwardly through the discharge opening. The guide wall further presents an inward side to grass clippings that have been generated in the mulching mode to direct such clippings inwardly in the cutting chamber away from the discharge opening.

BRIEF DESCRIPTION OF THE DRAWINGS

This invention will be described more fully in the following Detailed Description, when taken in conjunction with the following drawings, in which like reference numerals refer to like elements throughout.

DETAILED DESCRIPTION

Figure 1:
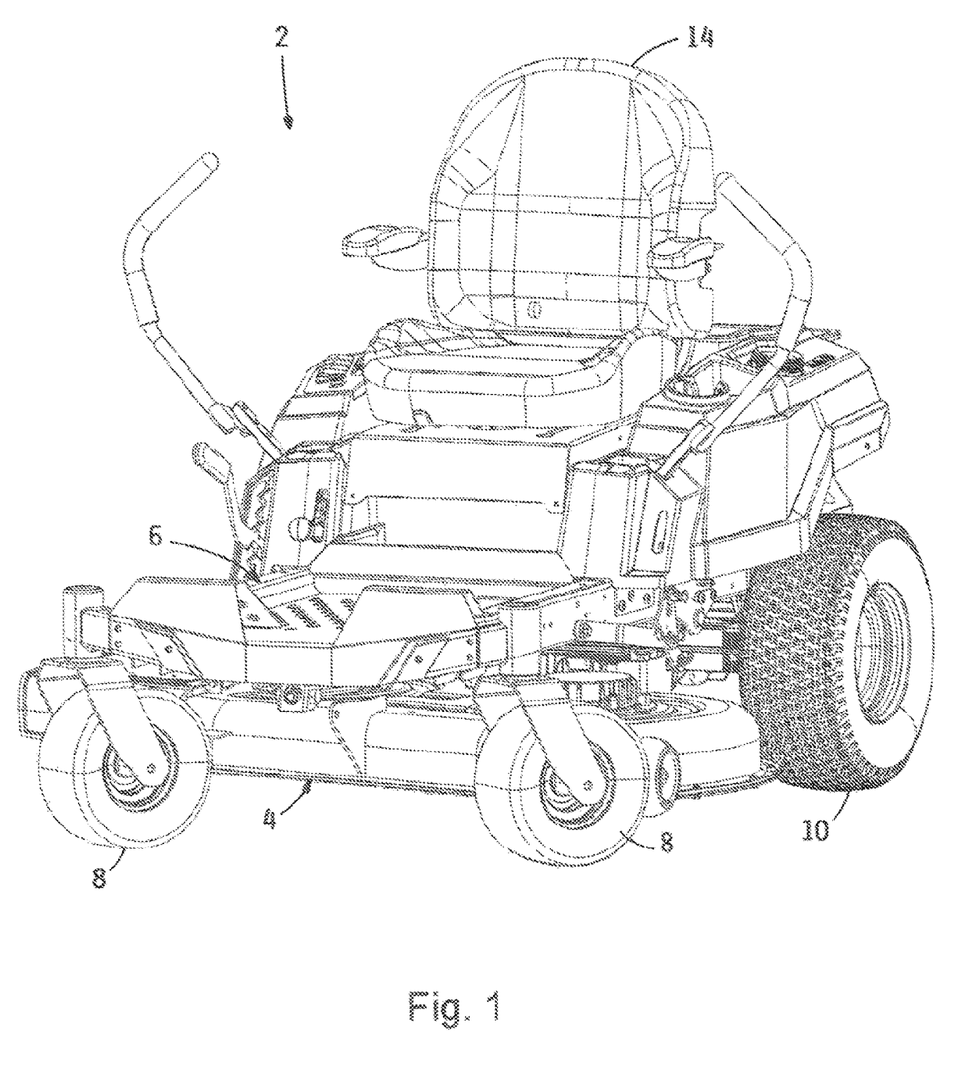
FIG. 1 is a perspective view of a rotary mower equipped with a rotary cutting deck according to one embodiment of this invention.

FIG. 1 illustrates a rotary mower 2 equipped with one embodiment of a rotary cutting deck 4 according to this invention. Mower 2 has a traction frame 6 that is supported for rolling over the ground by a pair of front caster wheels 8 and by a pair of rear drive wheels 10. A prime mover (not shown) or other source of power is carried on traction frame 6 to self-propel mower 2 by rotating drive wheels 10 and to provide power to rotate various rotary cutting blades 12 carried on deck 4. Deck 4 is mounted to traction frame 6 in a manner well known in the art in a mid-mount position between front wheels 8 and rear wheels 10.

Traction frame 6 preferably includes a seat 14 for carrying an operator in a seated position. Alternatively, traction frame 6 could be a stand-on type in which the operator is carried in a standing position on a rear foot platform provided on traction frame 6. In addition, traction frame 6 may also be a walk behind frame, a remotely controlled frame, or an autonomous, self-guiding frame. Thus, the type of mower 2 to which deck 4 is attached is not important to this invention.

Figure 2:
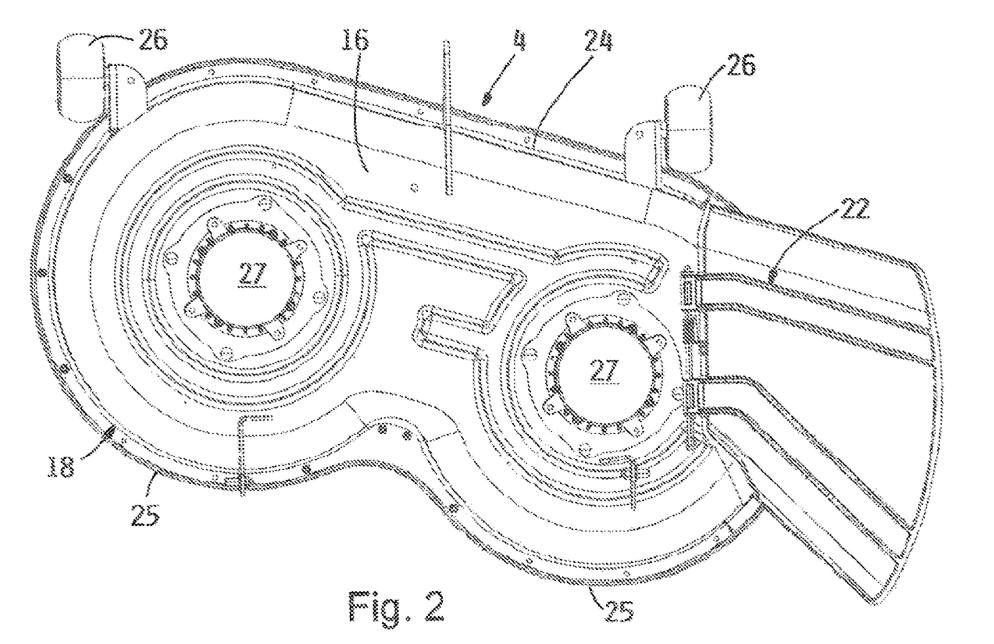
FIG. 2 is a top plan view of the cutting deck shown in FIG. 1.
Figure 3:
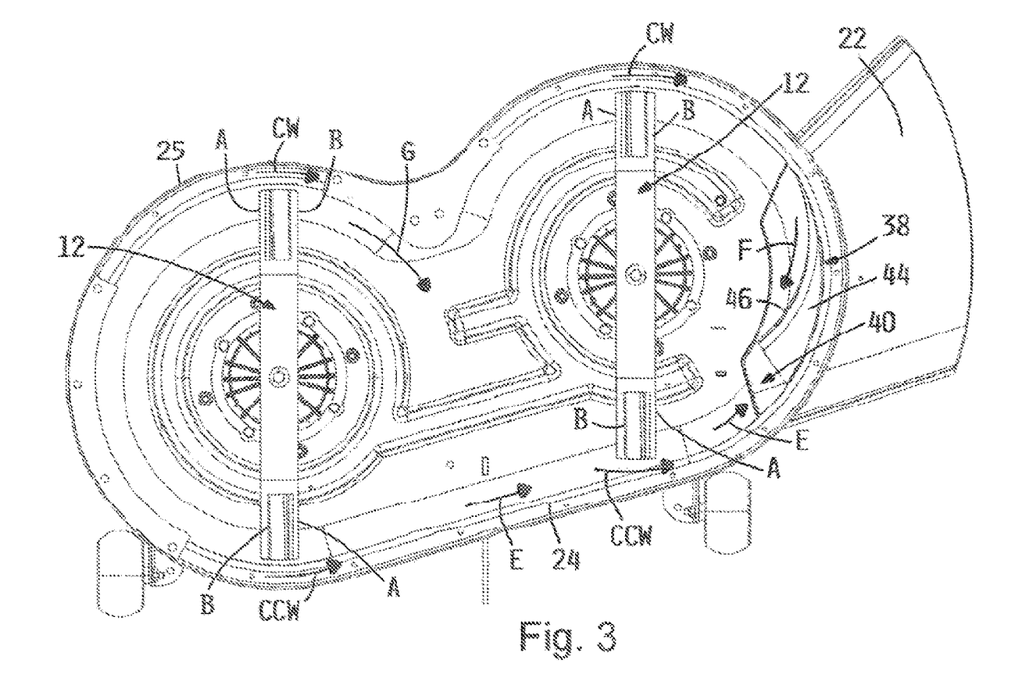
FIG. 3 is a bottom plan view of the cutting deck shown in FIG. 1.
Figure 6:
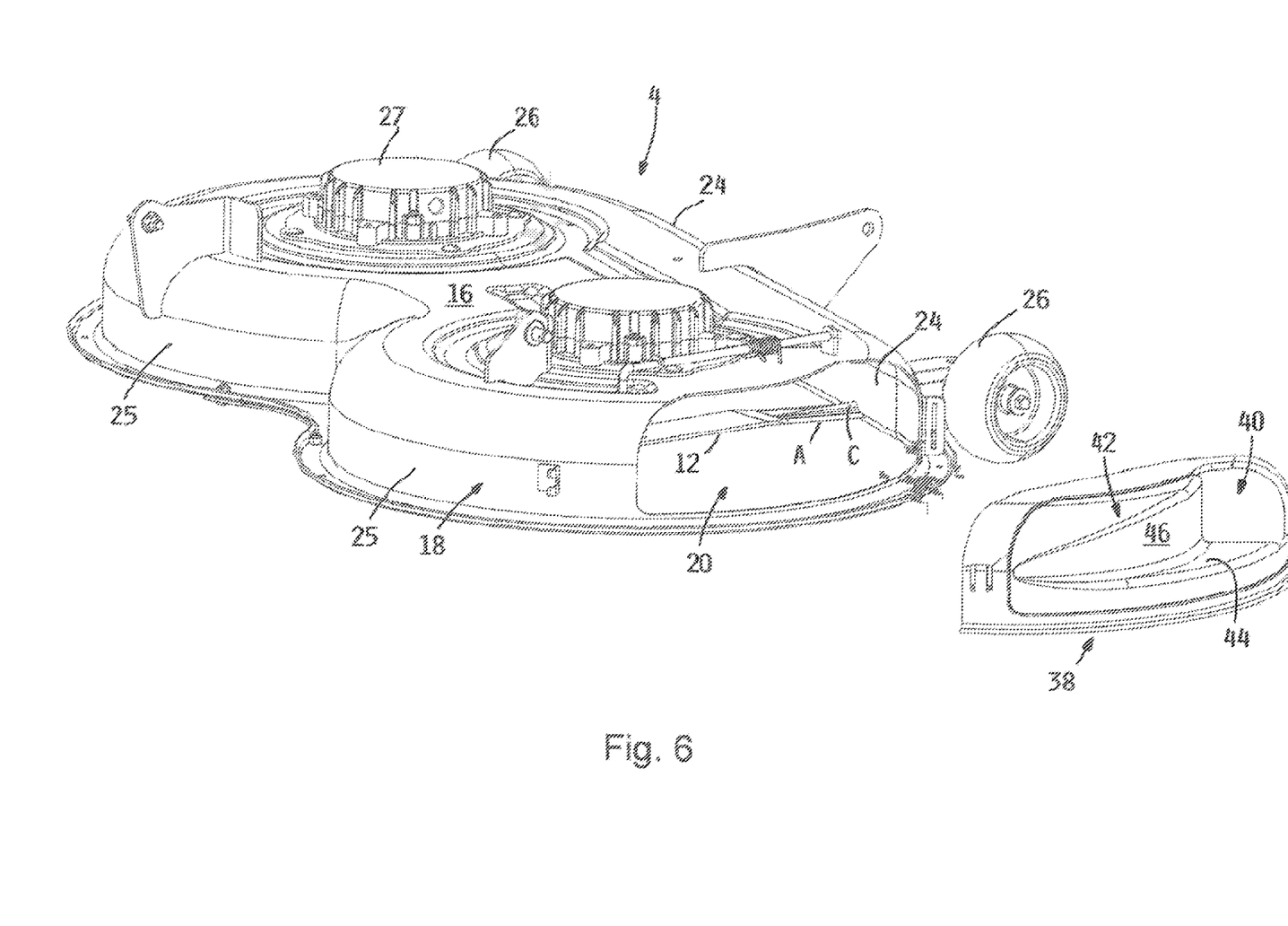
FIG. 6 is a perspective view of the cutting deck shown in FIG. 1, particularly illustrating a flow director for the grass clippings generated by the operation of the cutting deck with the flow director being shown exploded away from a typically sized and shaped side discharge opening in a side wall of the deck in which the flow director is to be installed.

Referring now to FIGS. 2 and 3, deck 4 comprises a top wall 16 and a peripheral skirt 18 extending downwardly for a short distance from the outer edges of top wall 16. Skirt 18 is substantially continuous except for a first side discharge opening 20 shown in FIG. 6 provided in one of the lateral side walls of skirt 18. A typical side discharge chute 22 having a downwardly facing U-shape is attached to deck 4 and extends outwardly from first opening 20 to shield bystanders from the flow of grass clippings or any thrown objects which are being discharged from deck 4. The bottom face of deck 4 is open towards the ground. Skirt 18 has a substantially linear front wall 24 which mounts a pair of laterally spaced anti-scalp wheels or rollers 26.

As best shown in FIG. 3, the underside of deck 4 carries two laterally spaced blades 12 beneath top wall 16 and within skirt 18 of deck 4. Deck 4 has a scalloped rear wall having a pair of semicircular sections 25 which partially surround the rear portions of the orbits of blades 12. In the embodiment shown herein, blades 12 are staggered fore-and-aft relative to one another with the inner portions of the orbits of blades 12 slightly overlapping one another. Thus, blades 12 will cut a single, unbroken swath of grass that is wider than the swath that would have been cut by either blade 12 alone. Alternatively, blades 12 could be arranged directly side-by-side with the inner portions of the orbits of blades 12 slightly overlapping one another. However, in this alternative blade arrangement, a timed drive system would be required to rotate blades 12 out of phase with one another to ensure that blades 12 never hit one another in the overlap region.

Preferably, blades 12 are powered by individual electric motors 27 which are powered by a source of electric power carried on traction frame 6. Thus, motors 27 are reversible at the click of a switch to change the direction of rotation of blades 12 without there being any cost incurred other than for the switch. While electric motors are disclosed, hydraulic motors could also be used supplied by pressurized hydraulic oil generated by a hydraulic system on traction frame 6 along with a valve to reverse the direction of oil flow when so desired. In addition, a reversible belt and pulley drive system or some other reversible mechanical drive system could be used as well.

Figure 4:
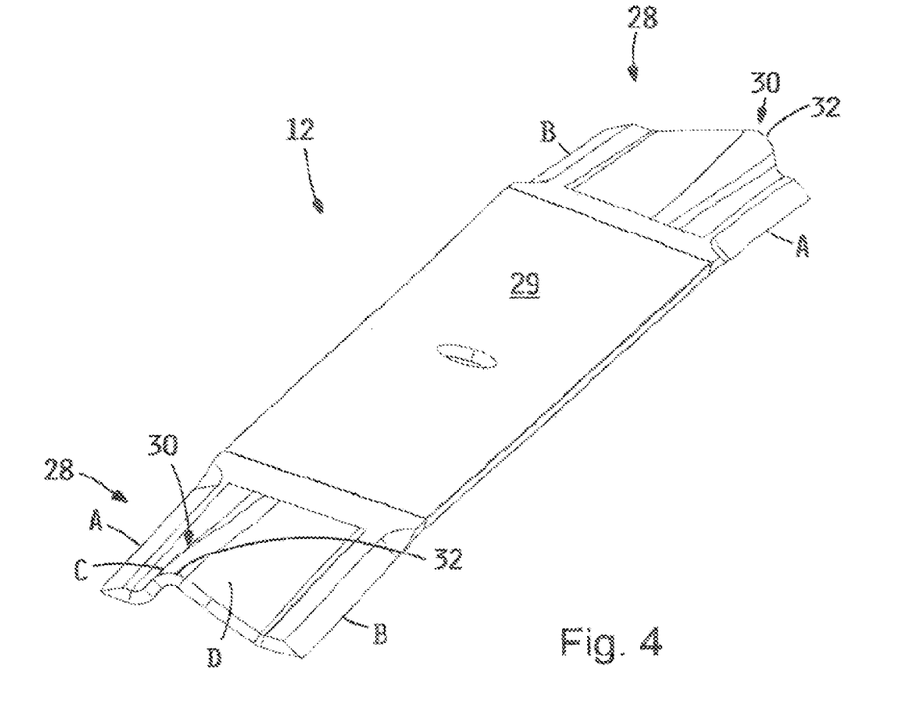
FIG. 4 is a perspective view of one of the cutting blades used in the cutting deck shown in FIG. 1.
Figure 5:
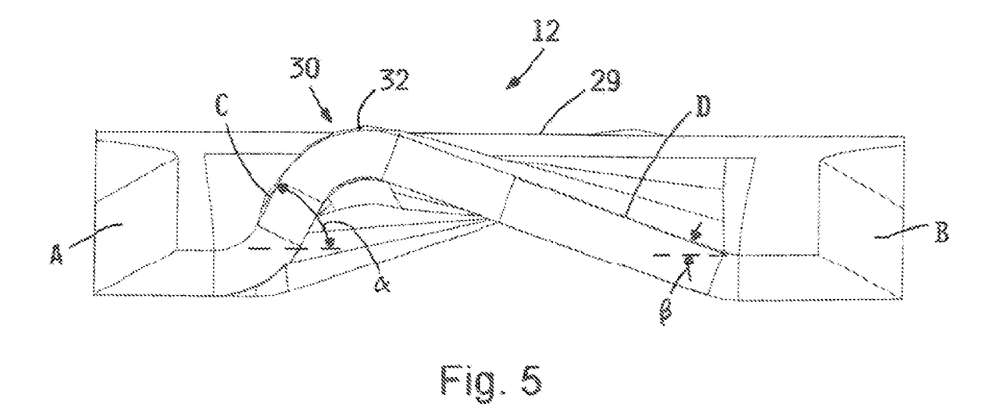
FIG. 5 is a side elevational view of the cutting blade shown in FIG. 4.

Referring now to FIGS. 4-5, each blade 12 has an elongated rectangular shape with opposite ends. Each blade 12 is identical. Thus, a description of one blade 12 will suffice to describe the other blade 12.

Each end 28 of blade 12 is double edged with a sharpened cutting edge A located on a front face and a sharpened cutting edge B located on a rear face. The lengths of cutting edges A and B are substantially the same as one another and may comprise about two to four inches. Ends 28 of blades 12 are also inclined slightly downwardly. Thus, cutting edges A and B are not purely horizontal relative to the horizontal central section of blade 12, but incline slightly downwardly relative to the central section 29 of blade 12 as they extend outwardly at an angle of about 5°.

Blade 12 has an upwardly extending ridge 30 between cutting edges A and B. Ridge 30 has a crest 32 which is generally parallel to cutting edges A and B. However, ridge 30 is asymmetric relative to cutting edges A and B with crest 32 of ridge 30 being closer to cutting edge A than crest 32 is to cutting edge B. As a result, the sloped transition between cutting edge A and crest 32 necessarily forms a short and steeply inclined face C. Correspondingly, the sloped transition between cutting edge B and crest 32 forms a face D that is necessarily longer and substantially more gently inclined as a result.

In one embodiment of blade 12, the angle α of inclination of face C is approximately 60° at the tip 34 of blade 12 while the angle β of face D is approximately 20° at blade tip 34. In this embodiment, face C is approximately three times steeper than face D at blade tip 34 over the same rise of crest 32. The rise of crest 32 gradually decreases as ridge 30 extends inwardly from blade tip 34 with ridge 30 disappearing at radial inner ends of cutting edges A and B.

Referring now to FIG. 6, first opening 20 is of the general size and shape typically found on prior art rotary mowers for the passage of grass clippings in a side discharge mode of operation. However, in this invention, a flow director 38 is mounted within and remains within first opening 20 during operation of mower 2. Flow director 38 is preferably molded as a single piece from a relatively hard and durable plastic material and is mounted in any suitable fashion, e.g. by threaded fasteners such as bolts or screws or by bungee cords or some other structure which does not require the use of tools, to the portions of deck 4 adjacent first opening 20. This is done primarily for the sake of convenience and cost savings. However, the geometry and functions provided by flow director 38 could alternatively be designed as part of deck 4 and would thus be built as an integral part of deck 4 during the manufacture of deck 4.

Figure 7:
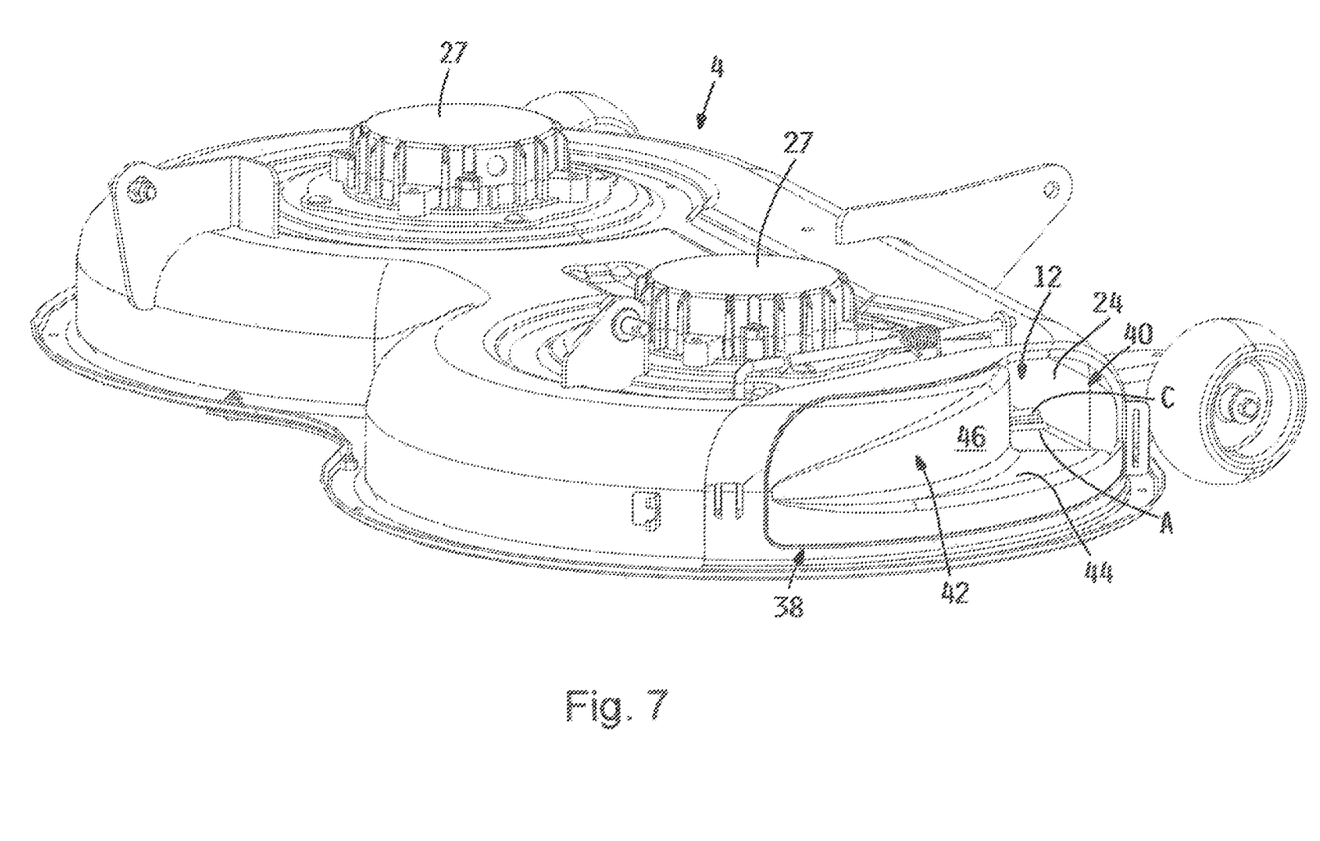
FIG. 7 is a perspective view similar to FIG. 6, particularly illustrating the flow director installed in the side discharge opening in the side wall of the cutting deck.

As further shown in FIGS. 6 and 7, flow director 38 provides a second side discharge opening 40 at a front end of flow director 38 which second opening effectively replaces first opening 20. Second opening 40 is located at the exit or grass clippings discharge end of front wall 24 of deck 4 when deck 4 is operating in the side discharge mode. However, second opening 40 is reduced in height and length compared to first opening 20.

The rest of flow director 38 downstream of second opening 40 is solid and fills in the rest of first opening 20 with downstream being taken with reference to the direction of rotation of the blade 12 adjacent flow director 38 when deck 4 is operating in the side discharge mode. As flow director 38 extends downstream away from second opening 40 when deck 4 is operating in the side discharge mode, it forms a generally L-shaped, curved baffle 42 having a substantially horizontal floor 44 and a substantially vertical, upwardly extending interior guide wall 46. The curved guide wall 46 progressively decreases in height and floor 44 progressively decreases in width as flow director 38 extends downstream away from second opening 40 as best shown in FIG. 6. Eventually, baffle 42 disappears adjacent a rear end of flow director 38 with the rear end of guide wall 46 being radially outboard of the front end of guide wall 46. Blade 12 adjacent flow director 38 is positioned to rotate beneath floor 44 of baffle 42 with blade 12 never hitting or striking any portion of flow director 38.

Figure 8:
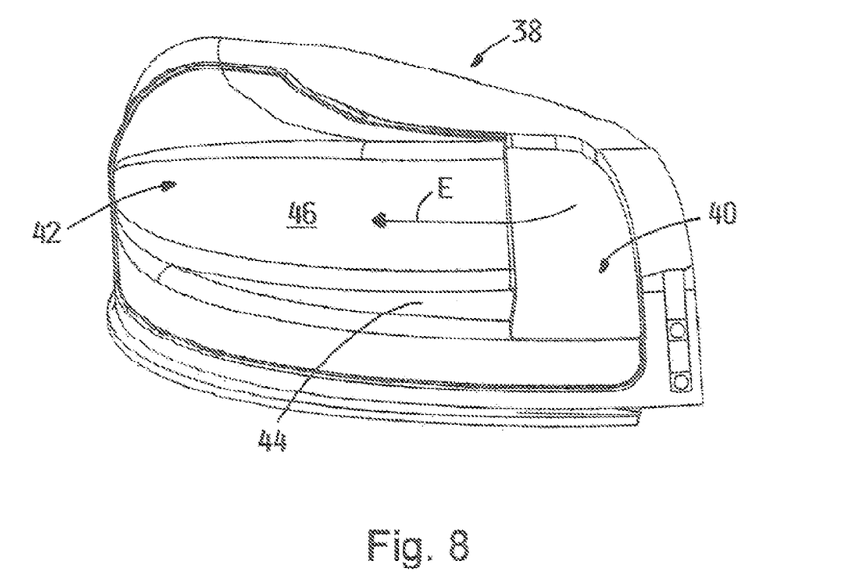
FIG. 8 is a perspective view from the front of the flow director shown in FIGS. 6 and 7 looking at the exterior of the flow director.

Referring now to FIG. 3 illustrating the side discharge mode of operation, second opening 40 in flow director 38 is always open to the passage of the grass clippings being generated by blades 12. Each blade 12 is rotated in the same counter-clockwise direction CCW so that cutting edges A are cutting grass. The steeply inclined faces C behind cutting edges A act as effective sails or vanes for creating an air flow within deck 4 that is directed along the inside of front wall 24 of skirt 18 of deck 4 in the direction of the arrows E in FIG. 3. This air flow E feeds substantially directly into second opening 40 provided by flow director 38. Thus, the grass clippings generated by cutting edges A and B during the counter-clockwise CCW rotation of blades 12 are quickly and efficiently thrown through second opening 40. Once the grass clippings pass through second opening 40, the grass clippings flow along floor 44 and guide wall 46 of baffle 42 and are progressively forced and ejected to the side of deck 4 by the outward curvature of the outer face of guide wall 46 of baffle 42 as further shown by the arrow E in FIG. 8.

Figure 9:
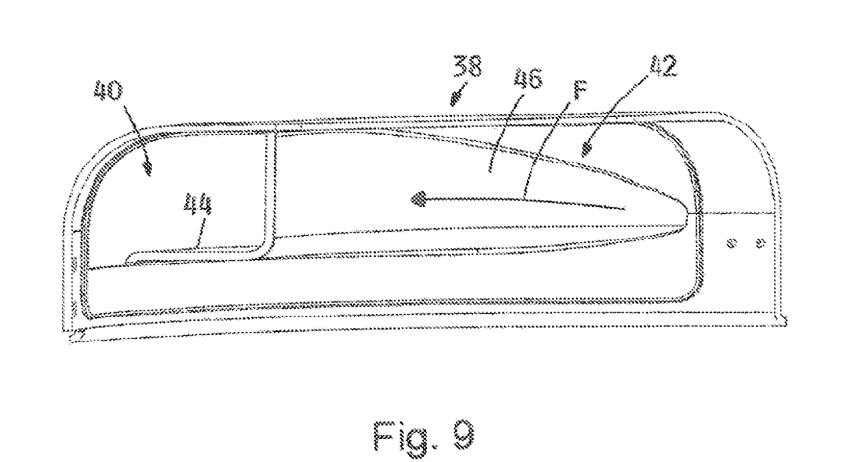
FIG. 9 is a perspective view similar to FIG. 8 looking at the interior of the flow director.

Referring now to FIGS. 3 and 9, the same L-shaped baffle 42 described above in flow director 38 provides an opposite function in the mulching mode of operation. Now, the inner face of vertical guide wall 46 of baffle 42 provides an inwardly curved surface taken with respect to the direction the grass clippings are being circulated in the mulching mode of operation.

Deck 4 can be easily placed into its mulching mode of operation by reversing the direction of rotation of blades 12 so that blades 12 both rotate in a clockwise direction CW in FIG. 3. In this direction, cutting edges B of blades 12 are the edges which are cutting the grass. The gently inclined slope of the face D that follows the edges B is also a relatively ineffective air flow generating sail. Moreover, the grass clippings entrained in the lessened air flow generated by the faces D, i.e., primarily the clippings from the blade 12 closest to flow director 38 as the clippings generated by the other blade 12 are not circulated near flow director 38, are directed inwardly towards the middle of deck 4 by the increasingly inward protrusion of the curved inner face of guide wall 46 of baffle 42 as shown by the arrow F in FIGS. 3 and 9. In addition and as best shown in FIG. 3, the curvature of the semi-circular portion 25 surrounding the other blade 12 also acts to direct clippings from such blade back towards the middle of deck 4 as shown by arrow G in FIG. 3. Thus, with the reversal in direction of the bidirectional blades 12 to the clockwise CW direction in FIG. 3 required for mulching, the grass clippings will substantially be directed inwardly and drop out of deck 4 through the open bottom face of deck 4 due to reduced air flow near the center of blades 12. Such grass clippings act as mulch in the cut grass swath rather than being thrown out through second opening 40 in flow director 38.

Referring again to FIG. 3 and when side discharge is desired, the counter-clockwise direction CCW of rotation of blades 12 is selected. The grass clippings being generated by blades 12 are thrown along front wall 24 of skirt 18 and will pass through second opening 40 provided by flow director 38 and then be ejected laterally under discharge chute 22. When mulching is desired, a clockwise CW direction of rotation of blades 12 in FIG. 3 is selected. The grass clippings then being generated by blades 12 will be recirculated within deck 4 until they are driven downwardly through the open bottom face of deck 4. During mulching the clippings are simply not directed at second opening 40 provided by flow director 38 and thus do not enter in any significant number the side discharge path provided by flow director 38.

Accordingly, switching between side discharge and mulching modes of operation is as easy as activating a switching device of some type to change the direction of rotation of the bidirectional, double edged blades. The convenience in which an operator can switch or toggle between side discharge and mulching modes of operation provides the operator with greater ease of operation. The operator no longer needs to manually install a mulching kit to use during mulching with the operator having to remove the mulching kit when side discharge is desired. In decks where structure is carried on deck 4, such as pivotal doors or plates that can be swung to a closed position to block the side discharge opening to enter into the mulching mode, the operator no longer needs to activate the linkages that control such doors or plates. Moreover, such movable and separately activated blocking structure is no longer required.

Figure 10:
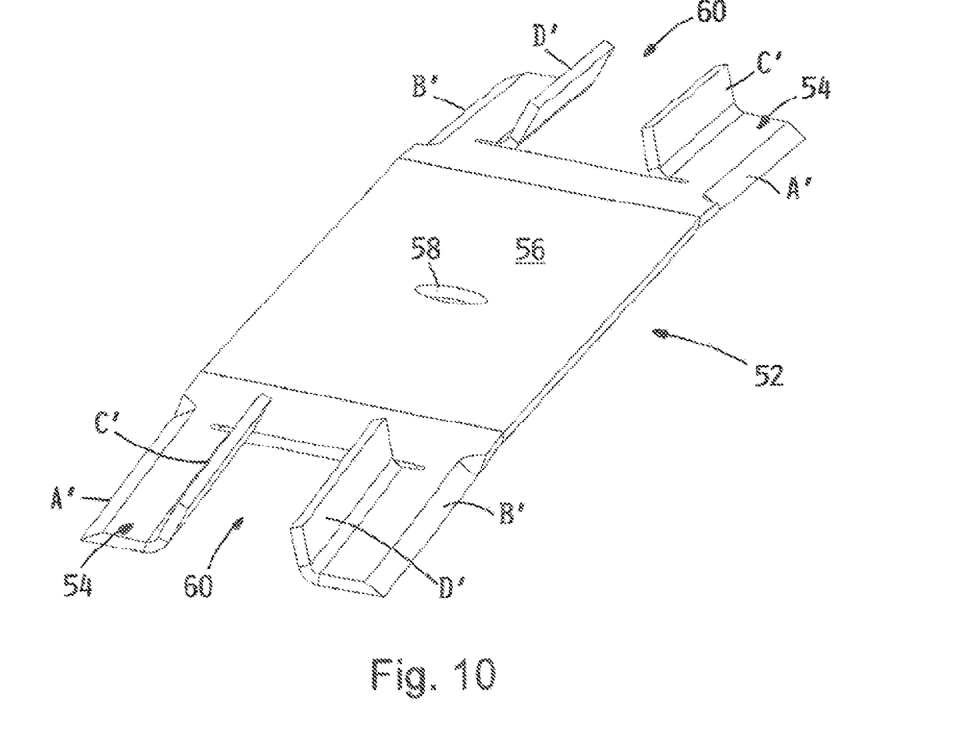
FIG. 10 is a perspective view of an alternative cutting blade which may be used in the cutting deck shown in FIG. 1.
Figure 11:
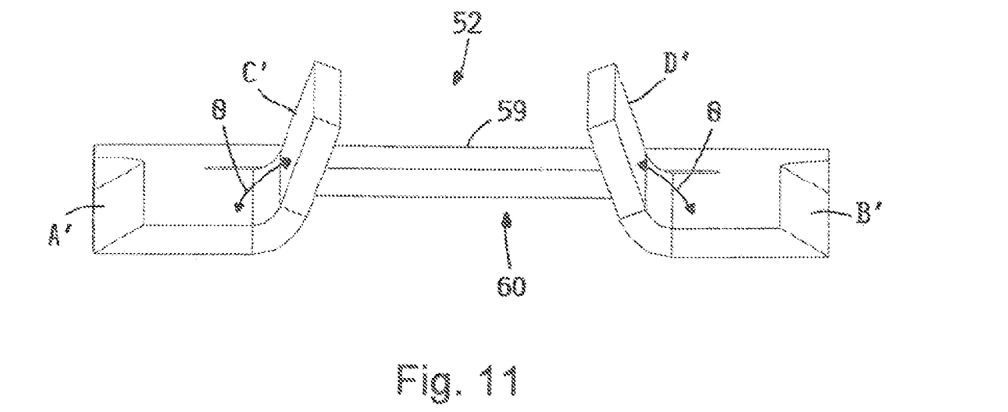
FIG. 11 is a side elevational view of the cutting blade shown in FIG. 10.

Referring now to FIGS. 10 and 11, an alternative blade 52 is depicted which may be used in place of each blade 12 described herein. Like blade 12, each blade 52 has an elongated rectangular shape with opposite ends. Each blade 52 is identical. Thus, a description of one blade 52 will suffice to describe the other blade 52.

Each end 54 of blade 52 is double edged with a sharpened cutting edge A' located on a front face and a sharpened cutting edge B' located on a rear face. The lengths of cutting edges A' and B' are substantially the same as one another and may comprise about two to four inches. Ends 54 of blades 52 are also inclined slightly downwardly. Thus, cutting edges A' and B' are not purely horizontal relative to the horizontal central section of blade 52, but incline slightly downwardly relative to the central section 56 of blade 52 as they extend outwardly at an angle of about 5°. A mounting hole 58 or any other suitable mounting is provided in central section 56 of blade 52 to allow blade 52 to be bolted or otherwise secured to the vertical downwardly extending drive shaft of one of the drive motors 27.

Each end 54 of blade 52 has a radial opening or slot 60 located between cutting edges A' and B'. Each slot 60 extends completely through the thickness of blade 52. Each slot 60 also extends radially inwardly from the tip of each end of blade 52 for a length approximately equal to the length of cutting edges A' and B'.

An upwardly extending, airflow generating sloped face C' is formed in each end of blade 52 by an upwardly bent portion of blade 52 that is inboard of cutting edge A'. Similarly, an upwardly extending, airflow generating sloped face D' is formed in each end of blade 52 by an upwardly bent portion of blade 52 that is inboard of cutting edge B'. Sloped faces C' and D' are substantially identical to one another. For example, each sloped face C' or D' is inclined upwardly at the same angle θ of approximately at least 60° or more. In addition, each sloped face C' or D' has a constant height relative to its adjacent cutting edge A' or B' between a radially outer end of each sloped face C' or D' and a radially inner end of each sloped face C' or D'. Accordingly, sloped faces C' and D' are symmetrical relative to one another along opposite sides of radial slot 60.

The Applicants currently believe that the radial slots 60 on each end of blade 52 extending as shown in FIGS. 10 and 11 allow air to flow more easily through each end of blade 52. This is believed to provide enhanced lift by sloped faces C' or D', each of which acts as an airflow generating sail, when cutting edge A' or B', respectively, is the leading edge of blade 52 taken with respect to the direction of rotation. While cutting blade 12 described earlier herein also provides better performance in this invention over standard blades known in the art, it is currently thought that cutting blade 52 may provide even better performance than cutting blade 12. Rather than use a radial slot 60 on each end 54 of blade 52, one or more openings or holes could be formed or drilled in each end 54 of blade 52 to permit the passage of air through each end 54 of blade 52.

Various modifications of this invention will be apparent to those skilled in the art. For example, while the blade tip configurations for the tips of blades 12 or 52 and the flow director 38 are preferably used together in the same deck 4, each could be used in deck 4 or other rotary cutting decks without using the other. Moreover, the blade tip configurations for the tips of blades 12 or 52 and the flow director 38 could be used together or individually in a rotary cutting deck having a single blade 12 or 52, a rotary cutting deck having more than two blades 12 or 52, and/or a rotary cutting deck having an additional third mode of operation comprising a rear discharge mode for throwing the grass clippings rearwardly from deck 4.

In addition, each blade 12 or 52 could comprise an assembly of two single edged blades laid on top of another and mounted on the drive shaft of a single motor 27. Each single edged blade would have its cutting edges disposed oppositely to the cutting edges on the other blade so that one blade in the two blade assembly would cut grass in the clockwise direction of rotation of the blade assembly while the other blade in the two blade assembly would cut grass in the counter-clockwise direction of rotation of the blade assembly. Any given single edged blade in the two blade assembly would preferably have an upwardly raised face inboard of each of its cutting edges to act as an airflow generating sail when the cutting edges on a given single edged blade are being used to cut grass. In such a two blade assembly, the overlaid single edged cutting blades could be angularly offset relative to one another in an X-shape or the like.

Accordingly, this invention is not limited to the details of the embodiment specifically described and illustrated herein.

The invention claimed is:

1. A rotary lawn mower, which comprises:
   (a) a cutting deck comprising a top wall and a peripheral skirt extending downwardly from the top wall, the top wall and peripheral skirt forming a cutting chamber having an open bottom face, the cutting chamber having a discharge opening located at least partially in the peripheral skirt of the cutting deck for allowing grass clippings to exit from the cutting chamber;
   (b) at least one cutting blade arrangement located within the cutting chamber with the at least one cutting blade arrangement being rotatable about a substantially vertical axis of rotation, each end of the at least one cutting blade arrangement comprising:
      (i) a front cutting edge and a rear cutting edge;
      (ii) an upwardly raised, front sloped face proximate the front cutting edge and an upwardly raised, rear sloped face proximate the rear cutting edge; and
      (iii) at least one opening located between the front and rear cutting edges and arranged to permit the passage of air therethrough; and
   (c) a reversible blade drive for allowing a user to select either:
      (i) a discharge mode of operation in which the at least one cutting blade arrangement rotates in a first direction about the axis of rotation with the front cutting edges being leading edges and the rear cutting edges being trailing edges, or
      (ii) a mulching mode of operation in which the at least one cutting blade arrangement rotates in a second opposite direction about the axis of rotation with the rear cutting edges being leading edges and the front cutting edges being trailing edges.

2. The mower of claim 1, wherein the at least one opening extends through a thickness of the at least one cutting blade arrangement.

3. The mower of claim 2, wherein the at least one opening comprises a radial slot.

4. The mower of claim 3, wherein the front and rear sloped faces on each end of the at least one cutting blade arrangement are inboard of the front and rear cutting edges.

5. The mower of claim 1, wherein the front and rear sloped faces have substantially the same angle of inclination as one another.

6. The mower of claim 1, wherein the front and rear sloped faces have a substantially constant height relative to the front and rear cutting edges.

7. The mower of claim 1, wherein the front sloped face has an inclination of at least approximately 60° at a tip of each end of the at least one cutting blade arrangement.

8. The mower of claim 1, wherein the at least one cutting blade arrangement comprises two or more blades with each blade being rotatable about its own separate substantially vertical axis of rotation.

9. The mower of claim 1, wherein the at least cutting one blade arrangement comprises two or more blades mounted to a drive shaft of a single motor.

10. The mower of claim 9, wherein the two or more blades include a first blade defining the front cutting edge and a second blade defining the rear cutting edge.

11. The mower of claim 10, wherein the first blade is angularly offset from the second blade.

12. A rotary lawn mower, which comprises:
（a) a cutting deck comprising a top wall and a peripheral skirt extending downwardly from the top wall, the top wall and peripheral skirt forming a cutting chamber having an open bottom face, the cutting chamber having a discharge opening located at least partially in the peripheral skirt of the cutting deck for allowing grass clippings to exit from the cutting chamber;
(b) at least one cutting blade located within the cutting chamber with the at least one cutting blade being rotatable about a substantially vertical axis of rotation, each end of the at least one cutting blade comprising:
  (i) a front cutting edge, a rear cutting edge, and an upwardly extending ridge between the front and rear cutting edges, the upwardly extending ridge having an asymmetric shape;
(c) a reversible blade drive for allowing a user to select either:
  (i) a discharge mode of operation in which the at least one cutting blade rotates in a first direction about the axis of rotation with the front cutting edges being leading edges and the rear cutting edges being trailing edges; or
  (ii) a mulching mode of operation in which the at least one cutting blade rotates in a second opposite direction about the axis of rotation with the rear cutting edges being leading edges and the front cutting edges being trailing edges.

13. The mower of claim 12, wherein the upwardly extending ridge includes a front sloped face and a rear sloped face, wherein the front sloped face is at least approximately three times steeper than the rear sloped face at a tip of each end of the at least one cutting blade.

14. The mower of claim 13, wherein the front sloped face is formed by a surface extending between the front cutting edge of the at least one cutting blade and a crest of the ridge and the rear sloped face is formed by a surface extending between the rear cutting edge of the at least one cutting blade and the crest of the ridge.

15. The mower of claim 14, wherein the ridge gradually decreases in height relative to the front and rear cutting edges as the ridge extends radially inwardly from the tip of each end of the at least one cutting blade.

16. The mower of claim 15, wherein the ridge disappears at radial inner ends of the front and rear cutting edges.

17. A rotary lawn mower, which comprises:
(a) a cutting deck comprising a top wall and a peripheral skirt extending downwardly from the top wall, the top wall and peripheral skirt forming a cutting chamber having an open bottom face, the cutting chamber having a discharge opening located at least partially in the peripheral skirt of the cutting deck for allowing grass clippings to exit from the cutting chamber;
(b) at least one cutting blade located within the cutting chamber with the at least one cutting blade being rotatable about a substantially vertical axis of rotation;
(c) a reversible blade drive for allowing a user to select either:
  (i) a discharge mode of operation in which the at least one cutting blade rotates in a first direction about the axis of rotation, or
  (ii) a mulching mode of operation in which the at least one cutting blade rotates in a second opposite direction about the axis of rotation; and
(d) a flow director mounted proximate the discharge opening, the flow director being arranged and configured to:
  (i) direct grass clippings generated in the discharge mode outwardly through the discharge opening; and
  (ii) direct grass clippings generated in the mulching mode inwardly in the cutting chamber in a direction away from the discharge opening.

18. The mower of claim 17, wherein the flow director defines a substantially vertical guide wall and a substantially horizontal floor located along a bottom edge of the guide wall and extending between the guide wall and the peripheral skirt of the cutting deck.

19. The mower of claim 18, wherein the flow director is formed as a single component separate from the cutting deck, and further includes fasteners for removably mounting the flow director to the cutting deck adjacent the discharge opening.

20. The mower of claim 17, wherein the at least one cutting blade comprises two or more blades mounted within the cutting chamber with each blade being rotatable about its own separate substantially vertical axis of rotation.

\* \* \* \* \*